US009604628B2

(12) United States Patent
Wang et al.

(10) Patent No.: US 9,604,628 B2
(45) Date of Patent: Mar. 28, 2017

(54) POWERTRAIN CONTROL OF A HYBRID VEHICLE IN PARK OR NEUTRAL

(71) Applicant: FORD GLOBAL TECHNOLOGIES, LLC, Dearborn, MI (US)

(72) Inventors: Xiaoyong Wang, Novi, MI (US); Wei Liang, Farmington Hills, MI (US); Rajit Johri, Ann Arbor, MI (US); Mark Steven Yamazaki, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 14/157,677

(22) Filed: Jan. 17, 2014

(65) Prior Publication Data

US 2015/0203091 A1 Jul. 23, 2015

(51) Int. Cl.
*B60W 20/00* (2016.01)
*B60W 10/02* (2006.01)
*B60W 10/06* (2006.01)
*B60W 10/08* (2006.01)
*B60W 20/10* (2016.01)
*B60W 30/18* (2012.01)

(52) U.S. Cl.
CPC ............ *B60W 20/10* (2013.01); *B60W 10/02* (2013.01); *B60W 10/06* (2013.01); *B60W 10/08* (2013.01); *B60W 20/00* (2013.01); *B60W 30/18054* (2013.01); *B60W 2540/103* (2013.01); *B60W 2710/0666* (2013.01); *B60W 2710/082* (2013.01); *Y02T 10/6286* (2013.01); *Y10S 903/93* (2013.01)

(58) Field of Classification Search
CPC ........ G06F 19/00; F16D 43/28; B60W 20/00; B60W 10/06; B60W 10/08; B60W 10/02; B60W 20/10
See application file for complete search history.

(56) References Cited

U.S. PATENT DOCUMENTS 6,624,527 B1 * 9/2003 Crombez et al. ........... 290/40 C
6,664,651 B1 * 12/2003 Kotre et al. .................... 290/29
7,412,310 B2 8/2008 Brigham et al.
(Continued)

*Primary Examiner* — Aaron L Troost
*Assistant Examiner* — Martin Weeks
(74) *Attorney, Agent, or Firm* — David B. Kelley; Brooks Kushman P.C.

(57) ABSTRACT

A hybrid vehicle includes an engine and an electric machine selectively coupled to the engine via a clutch. The engine, electric machine, and clutch are arranged along a common axis. At least one controller is programmed to execute various commands when the vehicle is in park or neutral and the accelerator pedal of the vehicle is depressed. This enhances perceived vehicle reactions in response to accelerator pedal movement. To do so, the controller is programmed to control a rate of speed increase of the electric machine based on a rate of the depression of the accelerator pedal (e.g., "speed control"). Furthermore, the torque output of the engine is controlled to a target value irrespective of engine speed and engine torque is converted into electric energy via the electric machine (e.g., "torque control"). The rate of speed increase of the electric machine is altered when the engine is started.

17 Claims, 3 Drawing Sheets

(56) References Cited

U.S. PATENT DOCUMENTS

| | | |
|---|---|---|
| 8,092,339 B2 | 1/2012 | Heap et al. |
| 8,112,207 B2 | 2/2012 | Heap et al. |
| 8,271,173 B2 | 9/2012 | Wilmanowicz et al. |
| 2004/0164690 A1* | 8/2004 | Degner et al. ............... 318/268 |
| 2008/0182722 A1* | 7/2008 | Colvin et al. ............... 477/180 |
| 2011/0098152 A1* | 4/2011 | Sah et al. ..................... 477/86 |
| 2011/0118915 A1* | 5/2011 | Ortmann et al. ............. 701/22 |
| 2012/0173100 A1* | 7/2012 | Ellis ............................. 701/54 |
| 2012/0309587 A1* | 12/2012 | Nozaki ........................... 477/5 |
| 2013/0297105 A1* | 11/2013 | Yamazaki ............... B60K 6/48 701/22 |
| 2014/0142795 A1* | 5/2014 | Akebono et al. ............. 701/22 |
| 2014/0195078 A1* | 7/2014 | Severinsky et al. .......... 701/22 |

* cited by examiner

POWERTRAIN CONTROL OF A HYBRID VEHICLE IN PARK OR NEUTRAL

TECHNICAL FIELD

The present disclosure relates to controlling an electric machine and an engine in a hybrid vehicle while the vehicle is in Park or Neutral in response to a depression of an accelerator pedal.

BACKGROUND

In a conventional non-hybrid vehicle, an internal combustion engine serves as the sole source of propulsion. The output of the engine may be generally proportional to depression of an accelerator pedal. When the vehicle operator depresses the accelerator pedal while the vehicle is in Park or Neutral, the operator receives a feedback response from the engine.

Hybrid electric vehicles incorporate an electric machine with the internal combustion engine such that two sources of propulsion are available. This may, for example, provide improved fuel economy compared to a conventional non-hybrid vehicle. A control system in a hybrid electric vehicle may, at times, turn off the engine while remains in operation. It may be particularly beneficial to maintain the engine in a disabled state while the vehicle is in Park or Neutral in order to prevent what would otherwise be wasted output of the engine.

SUMMARY

According to one embodiment, a method is presented for controlling a vehicle. The vehicle includes an engine coupled to an electric machine via a clutch such that torque output by the engine is converted to electric power by the electric machine. The method includes, in response to a depression of an accelerator pedal while the vehicle is on and in park or neutral, controlling a rate of speed increase of an electric machine based on a rate of the depression of the accelerator pedal (i.e., "speed control"). Additionally, in response to the depression of the accelerator pedal while the vehicle is on and in park, and in response to a start of an engine, the torque is controlled to a target value irrespective of engine speed (e.g., "torque control"), and the rate of speed increase of the electric machine is altered according to the depression of the accelerator pedal. When the accelerator pedal is depressed beyond a fixed depression threshold, the engine is started irrespective of other factors. Alternatively, or additionally, the engine is started when the speed of the electric machine reaches a predetermined speed.

According to another embodiment, a vehicle includes an engine, a traction battery, an electric machine, and a clutch configured to selectively couple the engine and the electric machine. The vehicle also includes at least one controller programmed to, in response to an accelerator pedal being depressed beyond a fixed threshold while the vehicle is in park or neutral, engage the clutch and start the engine irrespective of state of charge of the battery. Once the engine is started, the at least one controller can be programmed to set a speed of the electric machine according to a position of the accelerator pedal. The at least one controller can also be programmed to alter a rate of change of speed of the electric machine (and therefore the engine due to the engine being coupled to the electric machine) based on a rate of change of the depression of the accelerator pedal. A look-up table or the like can be utilized to provide a predetermined correlation between the accelerator depression and a commanded speed of the electric machine.

According to yet another embodiment, a vehicle includes an engine, an electric machine, and a clutch configured to selectively couple the engine and electric machine. At least one controller is programmed to, in response to the vehicle being in park or neutral, operate the electric machine in a speed control mode when on and operate the engine in a torque control mode when on. The speed control mode is, for example, a mode in which the controller actively controls the speed of the electric machine as a calibratable function of the accelerator pedal. The torque control mode is, for example, a mode in which the speed of the engine is a result of the coupled-to electric machine and in which the torque of the engine the is absorbed and converted into electric energy by the electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
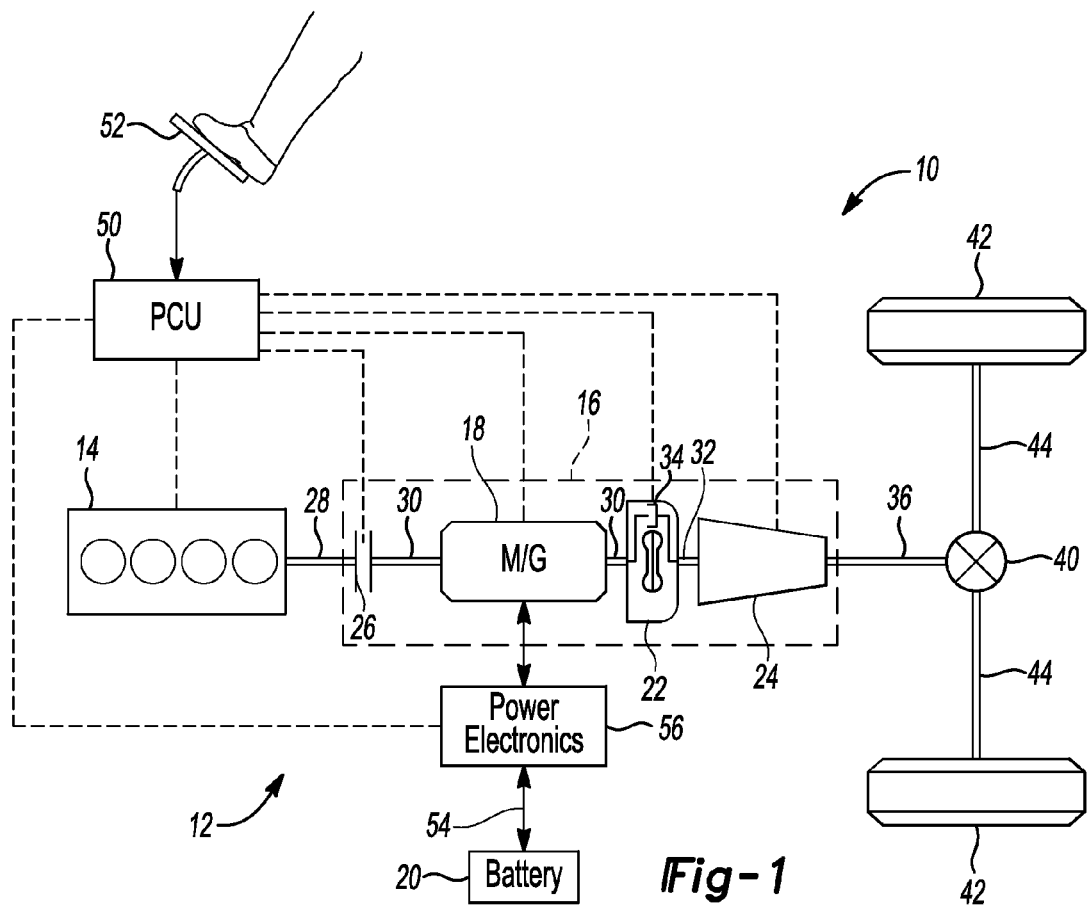
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G, or motor) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36. For example, the transmission 16 or gearbox 24 may include a park mechanism and a shifting clutch. When the park mechanism is engaged the gearbox 24 is in Park. When the park mechanism and shift clutch are disengaged, the gearbox 24 is in Neutral. Park or Neutral may be selected using a gear selection via a PRNDL input selected by the vehicle operator. When the gearbox 24 is in Park or Neutral, torque flow through the gearbox 24 is interrupted such that any torque at the input to the gearbox 24 is not transmitted to the output 36 and to the wheels 42.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" or "control system" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

The M/G 18 and the battery 20 have an electrical limit that provides a maximum positive and negative torque or power available electrically. The electrical limit may be based on a number of factors, including, but not limited to, M/G temperature, state of charge of the battery, battery temperature, maximum electric machine torque and speed, and the like. The electrical limit may vary as the vehicle operating conditions change, and may be determined by the control system or controller 50. The controller 50 may monitor the battery temperature, voltage, current, state of charge (SOC)

and determine the maximum allowable discharge power limit and the maximum allowable charge power limit at that time.

The controller 50 also provides control of the gear ratio of the transmission gearbox 24 and shifting. The controller 50 may receive a PRNDL command from a user input, such as a gear shift lever. When the user requests Park (P), the controller engages the park mechanism in the gearbox 24. When the user requests Neutral (N), the controller disengages the park mechanism and/or the shifting clutch.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

In a conventional, non-hybrid vehicle, an acceleration pedal depression causes the output of the engine to correspondingly increase. This is true while the vehicle is in Park or Neutral because the engine is operating at an idle speed at these times. In hybrid vehicles, such as the vehicle of FIG. 1, the engine can be disabled while the vehicle is in Park or Neutral to conserve fuel. Control systems manage the power distribution amongst the engine and the M/G at all times of operation. The control system according to the present disclosure manages the power distribution amongst the engine and the M/G to govern the behavior of the powertrain while the vehicle is in Park or Neutral.

Figure 2:
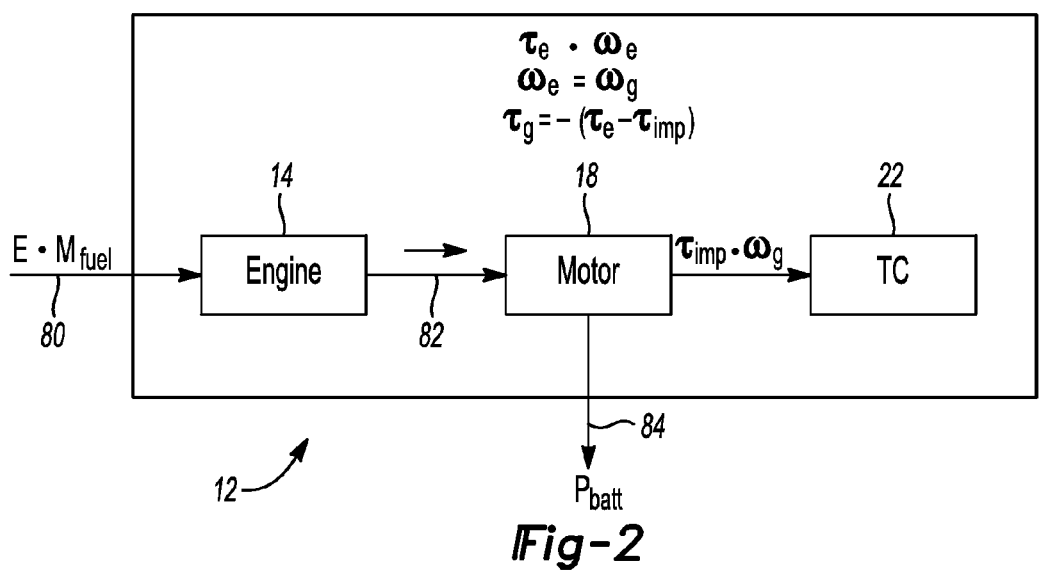
FIG. 2 is a block diagram for the vehicle illustrating power flow paths in the vehicle.

Referring to FIG. 2, a diagram showing power flow paths for the vehicle 10 when the vehicle is in Park or Neutral is illustrated. Based on various vehicle power demands, the controller determines that engine operation is needed to fulfill these vehicle power demands. Vehicle power demands may include the use of the M/G 18 as a generator to charge the battery 20, for example, when the state of charge of the battery 20 is below a threshold value. Vehicle power demands may also include demands by other vehicle systems or components such as the HVAC system. For example, the engine 14 may be required to operate in order to provide heat to a vehicle cabin. Alternatively, the engine 14 may be required in order to operate the air conditioning in the HVAC system to cool the passenger cabin. Vehicle power demands may also include auxiliary loads such as a user connecting a device to vehicle that requires electrical power from the vehicle to operate. If any of these (or other) vehicle power demands signify a need for additional power from the engine 14, the controller activates the engine 14 by engaging and locking the disconnect clutch 26.

With the disconnect clutch locked, the torque relationship at the impeller or input shaft 30 to the torque converter 22 is $$\tau_{imp} = \tau_e + \tau_g$$

where $\tau_e$ is the torque output of the engine 14 and $\tau_g$ is the torque output of the M/G 18. The torque output of the M/G 18, $\tau_g$, is positive if the machine is operated as a motor. The torque output of the M/G 18, $\tau_g$, is negative if the M/G is operated as a generator to charge or provide power to the battery 20.

With regard to FIG. 2 with the gearbox 24 in a Park or Neutral gear and the disconnect clutch 26 locked, the engine 14 may be operated to provide an output torque while the M/G 18 is operated as a generator to provide electric power to either charge the battery or supply the power for other vehicle or auxiliary demands. The mass flow rate of fuel that flows into the engine is $\dot{m}_f$ (kilograms per second). At 80, $E \cdot \dot{m}_f$ kJ/s (or kW) of power goes into the engine 14, where E is the heat value of the fuel. The engine 14 mechanical power output at 82 before the engine inertia is considered is $P_e = \tau_e \cdot \omega_e$, where $P_e$ is the power output of the engine in kW and $\omega_e$ is the rotational speed of the output shaft of the engine (radians per second).

A portion of the engine 14 power may be used to overcome any losses in the torque converter 22. Another portion of the engine power drives the electric machine 18 acting as a generator to generate electrical power for the battery 20. The generator operates at the same speed as the engine as the disconnect clutch 26 is locked such that $\omega_e = \omega_g$ and the M/G torque is negative because it is operating as a generator. The mechanical power of the electric machine 18 is $\tau_g \omega_g$.

The M/G 18 output power at 84 takes the form:

$$P_{batt} = \tau_g \omega_g - P_{eloss}(\tau_g, \omega_g)$$

where $P_{batt}$ is the battery input power from the generator (or generator output power) at 84, and $P_{eloss}(\tau_g, \omega_g)$ are the losses by the generator and is a function of electric machine speed and torque.

In the foregoing paragraphs, references will be made to a "speed control mode" and a "torque control mode." According to the present disclosure, the M/G operates in a "speed control mode" in which the controller actively controls the speed of the M/G as a (calibratable) function of the accelerator pedal. If the engine is on, it operates in a "torque control mode" in which the engine torque commanded is determined by the battery power request and the system losses at the M/G operating speed, with the torque being absorbed by the M/G and converted into electric energy to be stored in the battery. The engine torque realized downstream of the M/G is constant. The engine can operate in a torque control mode when, for example, the M/G drives the engine (acting as a reactionary component) to a higher speed.

While the vehicle is in Park or Neutral, the control system of the present disclosure must control the powertrain in such a way such that the powertrain provides intuitive and pleasant feedback to the driver. For example, if the operator of the vehicle depresses the accelerator pedal while the vehicle is in Park or Neutral, some amount of physical feedback should be given to the driver. According to the present disclosure, the M/G operates in the speed control mode while the vehicle remains in Park or Neutral, regardless of the state of the engine. As the accelerator pedal is depressed, the M/G speed increases (or "revs-up") to provide feedback that can be detected by the driver. If the engine ever activates or turns on while the M/G speed increases due to pedal movement, the engine operates in the torque control mode. During the torque control mode, the engine speed is equivalent to the speed of the M/G due to the disconnect clutch 26 being locked.

Figure 3:
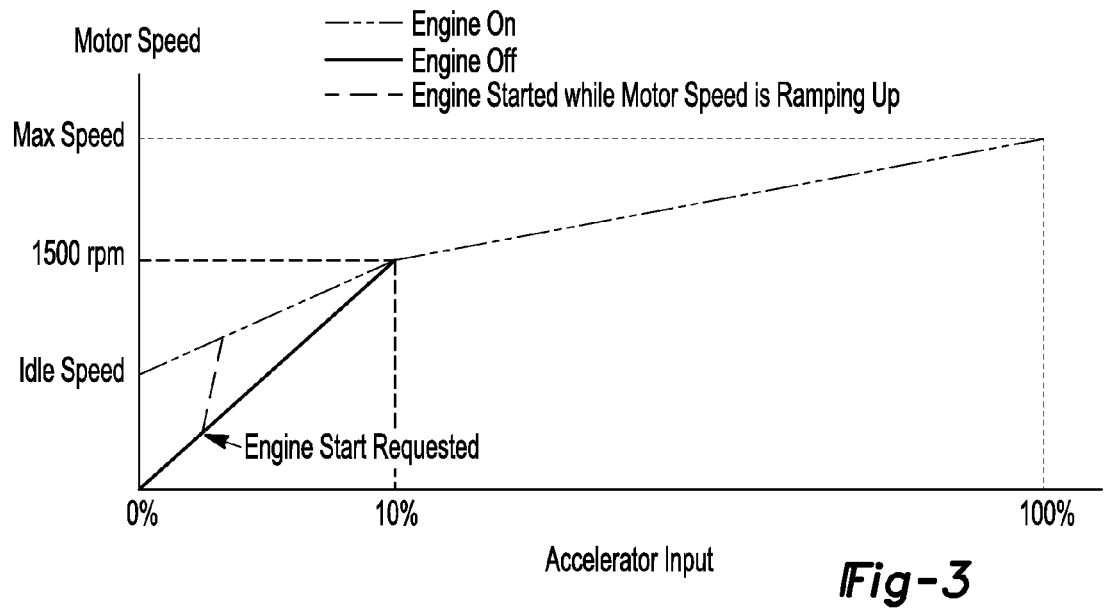
FIG. 3 is a graph illustrating a relationship between motor speed and accelerator pedal depression when the engine is on and off.

The speed of the M/G (and thus the speed of the engine, if on) while the vehicle is in Park or Neutral can be illustrated by FIG. 3. It should be understood that FIG. 3 is but one example; the relationship between the speed of the motor and the accelerator input should be calibratable to provide different levels of responsiveness at various pedal input levels.

Referring to FIG. 3, there are two plotted lines at 0% of accelerator pedal input. One line illustrates the motor-speed/accelerator-input relationship with the engine on, and the other line illustrates the relationship with the engine off. If the engine is on, the speed of the M/G is equivalent to the engine idle speed when the accelerator pedal is released. In response to accelerator pedal input, the controller commands a corresponding increase of speed of the M/G (operating in the speed control mode). This, in turn, causes the speed of the engine (operating in the torque control mode) to increase along with the M/G due to the disconnect clutch 26 being closed.

Alternatively, if the engine is off, the speed of the M/G is 0 when there is no accelerator pedal input. As the pedal is depressed, the speed of the M/G (operating in the speed control mode) correspondingly increases. While the M/G increases in speed while the driver tips-in, the engine may be commanded to start in order to provide sufficient power to the powertrain (described with reference to FIG. 3 below). If a certain speed of the M/G is obtained during pedal tip-in (e.g., 600 rpms, 1200 rpms, 1500 rpms), or if the pedal is depressed beyond a depression threshold (e.g., 2-5%), the engine is commanded to start. The speed profile of the M/G then follows the line shown in FIG. 2. At 100% of accelerator pedal depression, the motor/engine speed is at its max speed limit.

Figure 4:
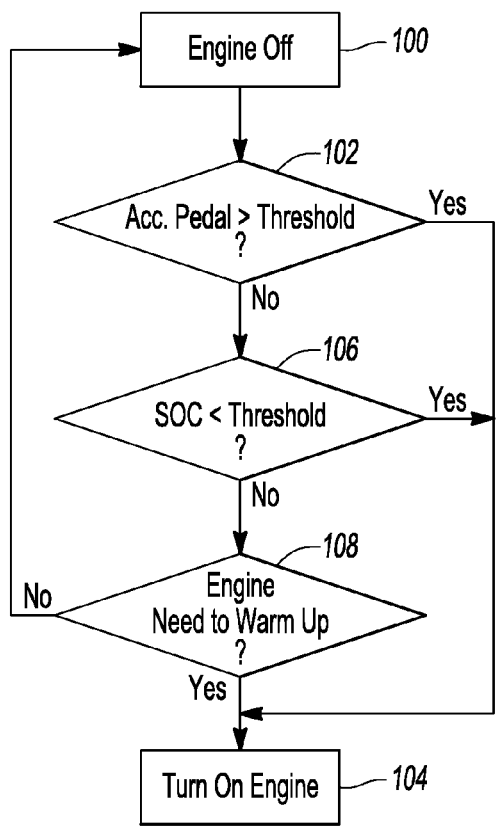
FIG. 4 is a flow chart illustrating a method of controlling an engine operation state while the vehicle is in Park or Neutral.

FIG. 4 illustrates three exemplary scenarios in which the controller 50 may command the engine 14 to turn on while the vehicle is in Park or Neutral. At 100, the engine 14 is off or otherwise not transmitting power through the disconnect clutch 26. At 102, the controller 50 determines if the accelerator pedal 52 has been depressed an amount exceeding a pedal depression threshold amount. A depression of the accelerator pedal while the vehicle is in Park or Neutral can indicate the operator's desire to rev the engine, for example. Based on the accelerator pedal displacement, the control system commands the engine to start at 104 by at least partially engaging the disconnect clutch 26 and commanding ignition in the engine 14. This provides the wanted feedback to the driver and the feel of a conventional (non-hybrid) vehicle by enabling the output of the engine 14 to rotate corresponding to user demand.

The pedal depression threshold at 102 is calibratable and is provided such that the engine is commanded to start if the accelerator pedal is pressed past the threshold. An accelerator pedal displacement sensor (not shown) may be provided that determines the amount of depression of the accelerator pedal 52. The threshold is preferably set or fixed between 2% and 5% of the full allowable displacement of the accelerator pedal 52. The threshold allows the control system to ignore slight or unintended pedal depressions less than the threshold because they are flagged as not indicative of an operator's desire to increase power output of the engine. The starting of the engine at 104 based on the accelerator pedal depression at 102 can be irrespective of other factors, such as the SOC of the battery.

Rather than (or in combination with) monitoring the accelerator pedal displacement, the controller can activate the engine based upon the speed of the motor. For instance, initial accelerator pedal movement while in Park or Neutral can immediately activate the M/G to spin. Once the M/G has reached a predetermined threshold (e.g., 1200 rpm), the controller will start the engine.

At 106, the control system compares the SOC of the battery 20 with a threshold charge amount. If the SOC of the battery is relatively low and under the threshold amount, the control system activates the engine according to methods previously described. This allows the engine to provide power to the M/G in order to generate electric power to be stored in the battery, according to methods and power flow described above.

In another example of activity that demands the engine to activate, at 108 the controller compares the temperature of the engine with a threshold. If the engine is below a temperature threshold, the controller commands the engine to start in order to warm up. If, for example, the vehicle is parked and off for a lengthy time in cold weather, the engine temperature reaches and maintains the temperature of the surrounding climate. When an operator turns the vehicle on, it may be inferred that the vehicle may be placed in Drive shortly thereafter, during which the engine may be needed to provide driving torque. However, if the engine is cold, the maximum power output of the engine may be limited. Starting the engine while the vehicle is in Park or Neutral based on the temperature of the engine therefore prepares the engine for an upcoming engine-activation event, increasing the future efficiency of the engine.

In any of the above-referenced scenarios in which the engine is activated, the engine remains operating in torque control mode while the vehicle remains in Park or Neutral. While the engine is on, the engine torque is a function of motor (M/G) torque. The motor torque is determined by the following relationship:

$$P_{batt} = \tau_g \omega_g - P_{eloss}(\tau_g, \omega_g)$$

in which $P_{batt}$ is the battery power request and is provided by the battery control, $\omega_g$ is the motor speed which is equal to the engine speed and described above with reference to FIG. 2, $P_{eloss}$ eloss is the electric loss characteristic of the motor, and $\tau_g$ is the motor torque. $\tau_g$ is the only unknown and thus can be determined from this equation.

With the motor torque $\tau_g$ being determined, the engine torque can be determined using the following relationship:

$$\tau_{imp} = \tau_e + \tau_g$$

where $\tau_{imp}$ is the torque of the impeller of the torque converter 22, and $\tau_e$ is the engine torque. $\tau_{imp}$ represents the spin loss of the torque converter and the transmission when in Park or Neutral. In short, the engine produces torque ($\tau_e$), the controller commands the M/G to regulate the speed of the motor and coupled engine ($\omega_g$), and the engine torque is absorbed through the M/G and stored as electric energy in the battery, providing battery power ($P_{batt}$).

Figure 5:
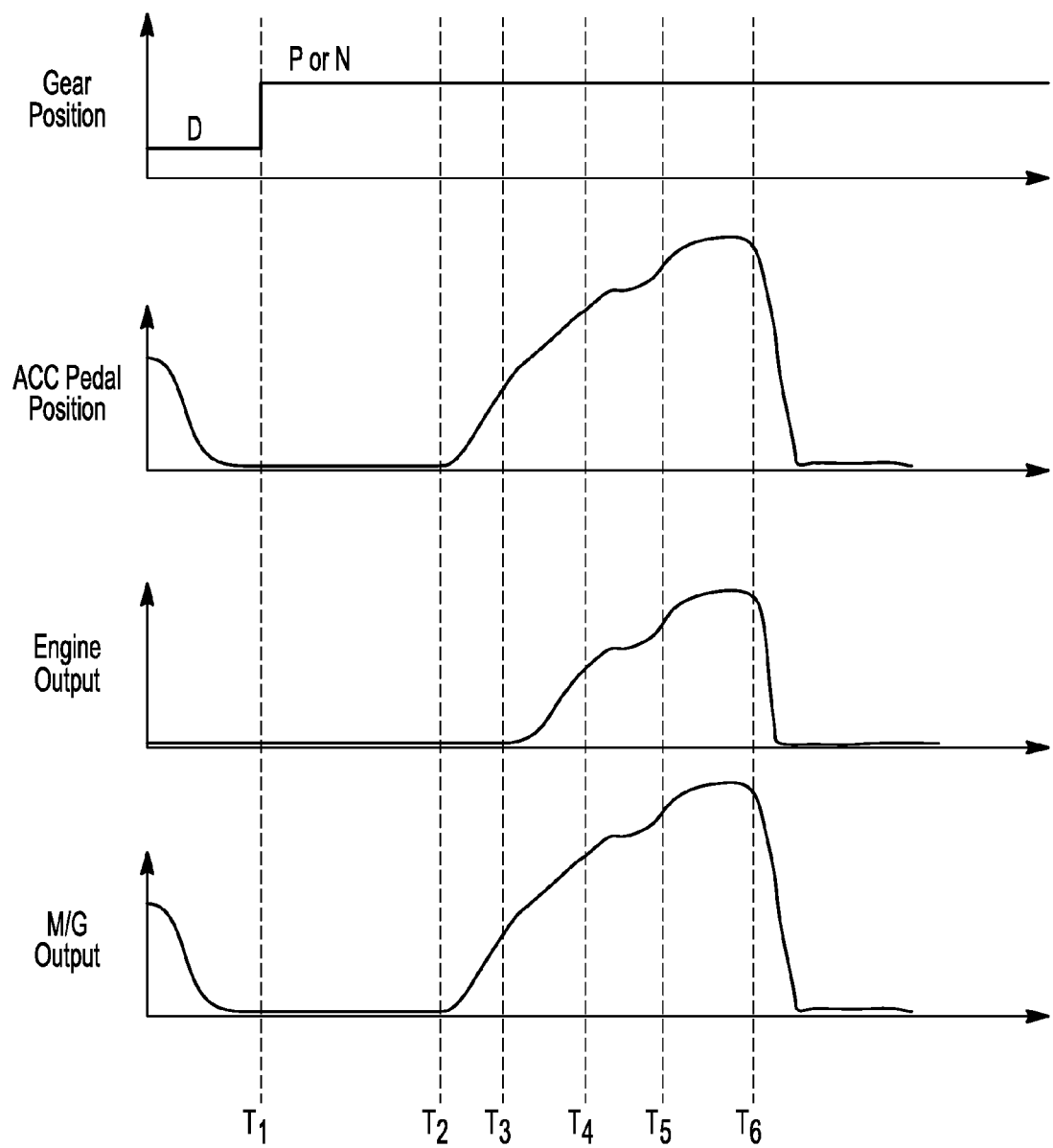
FIG. 5 is a timing chart for the vehicle illustrating an example of implementing the methods of FIGS. 2 and 3.

FIG. 5 illustrates an example of a timing chart or a signal diagram for the implementation of embodiments of the control system described above. The figure is not necessarily to scale but is intended to illustrative purposes in combination with the following description.

Before time $T_1$, the vehicle is operating in an electric-only mode of operation with the engine disabled. The operator of the vehicle removes pressure from the accelerator pedal. The vehicle may come to a complete stop, and at $T_1$ the operator puts the vehicle in Park or Neutral by altering the PRNDL mechanism. Between $T_1$ and $T_2$, the vehicle remains in Park or Neutral, and no input is given to the accelerator pedal.

At $T_2$, the operator begins to depress the accelerator pedal. At this time, the speed of the M/G immediately follows the user demand, although no torque is transmitted through the gearbox. The operator may feel a response from the output of the M/G but not from the engine. While the accelerator pedal continues to be depressed, the M/G operates in the speed control mode (described above) and changes speed as a direct result of the change in pedal depression.

Once the accelerator pedal has been depressed more than the depression threshold, the disconnect clutch is engaged and the engine is started at $T_3$. The engine start at $T_3$ can also occur once the rotational speed of the M/G reaches a predetermined speed threshold, as previously described. Once the clutch has fully engaged at $T_4$, the engine speed and M/G speed become equivalent. Both speeds continue to rise in order to meet the increase in accelerator pedal demands.

At $T_4$, a slight dip in the accelerator pedal demand is shown. As can be seen, the speed of the engine and motor dips correspondingly, which is governed by the accelerator pedal depression/electric machine speed relationship as described in FIG. 2-3. This continues to provide the operator with a direct feel of engine responsiveness during pedal movement while the vehicle is in Park or Neutral.

At $T_5$, the accelerator pedal demands begin to level off. This can be due to the accelerator pedal reaching a full throttle position, for example. In one embodiment, the speed profile of the engine and M/G can be tuned to increase at a slightly slower rate of increase in order to give a feedback to the operator on the approaching of the red line speed.

A tip-out of the accelerator pedal occurs at $T_6$. The engine and M/G both immediately follow the profile of the accelerator pedal, reducing the work of both power sources towards 0. At some time following $T_6$, the disconnect clutch may be disengaged and the engine may be turned off in order to conserve fuel while the vehicle is in Park or Neutral. When the disconnect clutch is disengaged, the engine speed is separated from the M/G speed and therefore may slow at a faster rate than the M/G. The deactivation of the engine may be time-delayed by a filter in order to account for an unintended tip-out of the accelerator pedal, or an abrupt change-in-mind of the operator followed by another increase in accelerator demand.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle comprising:
   in response to depression of an accelerator pedal while the vehicle is on and in park or neutral,
      controlling a rate of speed increase of an electric machine based on a rate of the depression, and
      in response to a start of an engine coupled to the electric machine via a clutch such that torque output by the engine is converted to electric power by the electric machine,
         controlling the torque to a target value irrespective of engine speed, and
         altering the rate of speed increase of the electric machine.

2. The method of claim 1, further comprising starting the engine in response to a position of the accelerator pedal exceeding a predetermined threshold.

3. The method of claim 1, further comprising starting the engine in response to a speed of the electric machine exceeding a predetermined threshold.

4. The method of claim 1, wherein altering the rate of speed increase includes reducing the rate of speed increase if electric machine speed or engine speed approach a red line speed.

5. The method of claim 1, further comprising controlling the torque of the engine based on a power output from the electric machine to a traction battery electrically coupled to the electric machine.

6. A vehicle comprising:
   an engine;
   a traction battery;
   an electric machine;
   a clutch configured to selectively couple the engine and electric machine; and
   at least one controller programmed to, in response to an accelerator pedal being depressed beyond a fixed threshold while the vehicle is in park or neutral, engage the clutch and start the engine irrespective of state of charge of the battery.

7. The vehicle of claim 6, wherein the at least one controller is further programmed to, subsequent to the start of the engine, set a speed of the electric machine according to a position of the accelerator pedal.

8. The vehicle of claim 7, wherein the at least one controller is further programmed to alter a rate of change of speed of the electric machine and engine based on a rate of change of the depression of the accelerator pedal.

9. The vehicle of claim 8, wherein the at least one controller is further programmed to, in response to a speed of the electric machine approaching a fixed speed threshold, reduce the rate of change of speed of the electric machine and engine to an amount less than the rate of change of the depression of the accelerator pedal.

10. The vehicle of claim 6, wherein the engine, clutch and electric machine are disposed along a common drive axis and wherein the clutch is disposed between the engine and electric machine.

11. A vehicle comprising:
an engine;
an electric machine;
a clutch configured to selectively couple the engine and electric machine; and
at least one controller programmed to, in response to the vehicle being in park or neutral, operate the electric machine in a speed control mode when on and operate the engine in a torque control mode when on.

12. The vehicle of claim 11, wherein the at least one controller is further programmed to, in response to an accelerator pedal being depressed beyond a predetermined threshold, engage the clutch and start the engine.

13. The vehicle of claim 11, wherein the at least one controller is further programmed to, in response to a temperature of the engine being less than a temperature threshold, engage the clutch and start the engine.

14. The vehicle of claim 11, wherein the at least one controller is further programmed to (i) increase a speed of the electric machine in response to accelerator pedal depression and (ii) engage the clutch and start the engine in response to the speed of the electric machine exceeding a predetermined threshold.

15. The vehicle of claim 11, wherein the at least one controller is further programmed to command the electric machine to operate at a speed proportional to accelerator pedal depression.

16. The vehicle of claim 11, wherein the speed of the electric machine increases at a first rate corresponding to accelerator pedal input while the engine is off and a second rate corresponding to accelerator pedal input while the engine is on.

17. The vehicle of claim 16, wherein the at least one controller is further programmed to increase the speed of the electric machine at a rate generally proportional to the amount of depression of the accelerator pedal.

* * * * *